United States Patent [19]

Navarro

[11] Patent Number: 4,870,737
[45] Date of Patent: Oct. 3, 1989

[54] BRAKE SPRING REMOVAL TOOL

[76] Inventor: Roger Navarro, 3501 Kemp Ave., El Paso, Tex. 79904-5413

[21] Appl. No.: 229,972

[22] Filed: Aug. 9, 1988

[51] Int. Cl.$^4$ .............................................. B23D 19/04
[52] U.S. Cl. ........................................ 29/227; 29/267
[58] Field of Search ............... 254/10.5, 131, 17; 29/225, 227, 267; 81/176.1, 176.15

[56] References Cited

U.S. PATENT DOCUMENTS

| | | | |
|---|---|---|---|
| 1,291,633 | 1/1919 | Allmon | 81/176.2 |
| 1,503,349 | 7/1924 | Clay | 81/176.15 |
| 1,579,992 | 4/1926 | Altman | 81/176.15 |
| 3,362,684 | 1/1968 | Davenport | 254/131 |
| 3,817,549 | 6/1974 | Bohannon et al. | 29/227 |
| 3,985,338 | 10/1976 | Hermann | 254/131 |
| 4,061,058 | 12/1977 | Douglas | 81/176.15 |

Primary Examiner—Robert C. Watson
Attorney, Agent, or Firm—Richard C. Litman

[57] ABSTRACT

A brake spring removal tool is disclosed. The tool includes laterally extending spurs which engage the coiled portion of the spring, allowing the user to remove or install the spring.

1 Claim, 2 Drawing Sheets

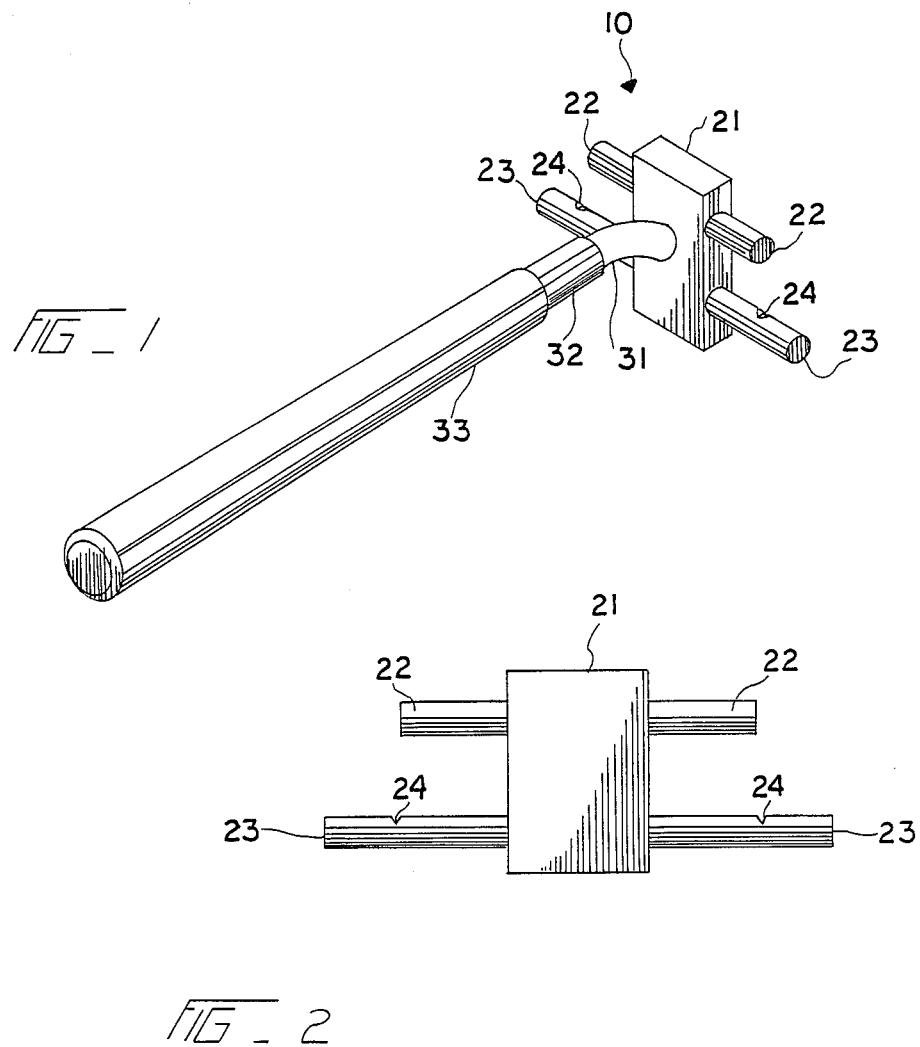

BRAKE SPRING REMOVAL TOOL

BACKGROUND OF THE INVENTION

1. Field of the Invention

The invention relates to a tool for removing a brake spring, and more particularly, the invention is directed to an improved tool for removing high-tension brake springs as found on drum type brakes, such as may be found in light and medium weight trucks.

The invention further relates to an improved brake spring removal tool which provides projecting spurs for engaging the spring and providing leverage to remove high tension springs with minimal effort. The device features two sets of spurs to facilitate use of the tool on both ends of the spring.

The removal of a brake spring form a drum brake system of a truck or other vehicle is not easily achieved. In the majority of situations, the affixed spring is not readily accessible or is angularly positioned in its taut position, making manual removal difficult. It is desirable to facilitate installation and removal of the brake spring by use of the claimed improvement tool. Although other tools may have been used as spring removal implements, it will be appreciated that the simplicity and effectiveness of the present invention greatly enhances the solution of the previous problem.

2. Description of the Prior Art

Several devices have been suggested in the past for removing a brake spring from a drum brake system. U.S. Pat. No. 2,274,981 to Grubb discloses a tool for removing a coil spring under heavy tension. Another example is found in Pat. No. 3,441,696 to Feingold which teaches a compound tool used to remove brake springs.

These patents or known teach and disclose various types of brake spring removal tools of sorts and of various manufactures, and the like, as well as methods of their construction; but none of them, whether taken singly or in combination, disclose the specific details of the combination of the invention in such a way as to bear upon the claims of the present invention.

SUMMARY OF THE INVENTION

An object, advantage and feature of the invention is to provide a novel brake spring removal tool which is operated manually to engage the inner surface of a coiled portion of a spring from a brake system. The invention particularly lends itself to use with a drum brake system as found in light and medium weight trucks.

Another object of the present invention is to provide an improved and novel manually operated tool which has projecting spurs that are attached to a handle-mounted block, and having spurs which project different distances from the block and alternately function as means for engaging and lifting the brake spring.

A further object of the present invention is to provide an improved brake spring removal tool having a long spur and a short spur extending from the block. The long spur has a notch near the distal end to engage and retain a portion of the spring to assist in lifting one end of the spring from its attachment to a mounting post.

Still another object of the present invention is to provide an improved brake spring removal tool having one spur engageable against a stationary surface to act as a fulcrum for another spur which is attached to one spring.

These, together with other objects and advantages of the invention reside in the details of the process and the operation thereof, as is more fully hereinafter described and claimed. References are made to drawings forming a part hereof, wherein like numerals refer to like parts throughout.

DESCRIPTION OF THE SEVERAL VIEWS OF THE DRAWINGS

FIG. 1 is a perspective view of a brake spring removal tool according to a preferred embodiment and best mode of the invention.

FIG. 2 is an end view of the present invention.

Similar reference figures denote corresponding parts throughout the figures of the drawings.

DESCRIPTION OF THE PREFERRED EMBODIMENT OF THE INVENTION

Figure 3:
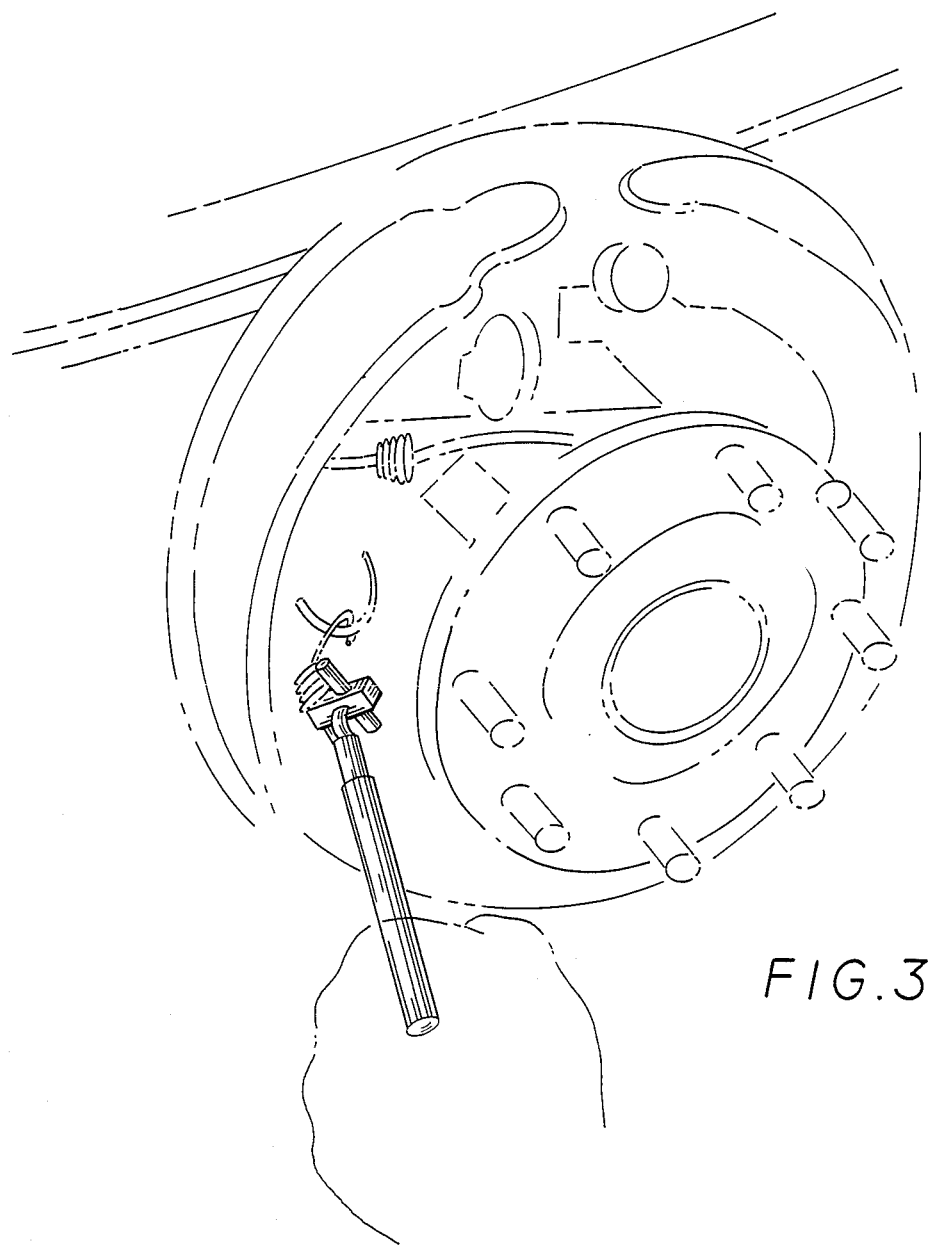
FIG. 3 is a perspective showing the present invention in use.

Referring now to the drawings, the brake spring removal tool, generally designated 10, is seen to lend itself to easy portability, and manual operation. The invention is suited both to the installation and removal of brake springs.

FIGS. 1 and 2 show the brake spring removal tool of the present invention, generally designated 10, having an elongated handle 33. The handle 33 has a tapered portion 32 leading into an angled portion 31. Angled portion 31 of handle 33 terminates in a block 21, which is substantially rectilinear in shape. Each side of the block 21 has an upper spur 22 and a lower spur 23 projecting perpendicularly from the side of the block 21. Upper spur 22 is typically shorter in length than lower spur 23. In addition, lower spur 23 may feature a notch 24. The notch 24 serves to assist in holding the spring on the spur, particularly when installing the spring.

Typical drum brake systems 50 are found on many vehicles, particularly trucks of the three-quarter to one ton range. These brake systems feature brake shoe tensioning springs 40. One end of these springs is connected to the brake shoe, the other end is connected to a fixed post.

By means of the above described brake spring removal tool, it can be seen in FIG. 3 that the user may insert one of the upper spurs 22 or lower spurs 23 into the coiled portion 41 of a brake spring 40. The upper spurs 22 or lower spurs 23 have an outside diameter which is slightly smaller than the inside diameter of the coiled portion of the brake spring. Thus, when the user twists the tool slightly, the spurs will engage the inside of the coiled portion of the spring 41, and extend the spring, causing the inside diameter of the spring to reduce. The constriction of the spring is caused by the extension of the spring, further causing the spring to grip or lock onto the spur. The user then lifts the spring upwards, thereby effecting removal of the spring from its mounting post.

The upper spur 22 may be of different diameter than lower spur 23. Thus, the upper spur 22 may be used to remove a spring of a different diameter than the lower spur.

In the case of a very high tension spring, the user may use one spur as a fulcrum against the base plate of the brake system, while prying the spring upwards by means of the other spur.

The foregoing is considered as illustrative only of the principles, of the invention. Furthermore, since numerous modifications and changes will readily occur to those skilled in the art, it is not desired to limit the invention to the exact construction and operation shown and described, and accordingly, all suitable modifications, and equivalents which may be resorted to, fall within the scope of the invention.

What is claimed is:

1. A tool for removing and installing a coiled brake spring end from engagement with a mounting post comprising, in combination:

an elongated handle;

a block rigidly affixed to one end of said elongated handle;

spring engaging means extending laterally from two opposite sides of said block;

said spring engaging means includes a pair of spurs extending laterally from each said opposite side of said block and being normally arranged in relation to said handle, each of said pair of spurs including one spur having a length greater than the length of the other spur; and said spurs having an outside diameter slightly less than the inside diameter of said coiled spring, whereby said spur is insertable into said spring to facilitate removal of said spring.

* * * * *